United States Patent
Buehler et al.

(10) Patent No.: US 8,859,652 B2
(45) Date of Patent: Oct. 14, 2014

(54) FLAME-RETARDANT POLYAMIDE MOLDING MATERIAL AND THE USE THEREOF

(71) Applicants: EMS-Patent AG, Domat/Ems (CH); Magdalena Dieterle-Buehler, Thusis (CH)

(72) Inventors: Friedrich Severin Buehler, Thusis (CH); Gabriel Garcia, Domat/Ems (CH); Botho Hoffmann, Domat/Ems (CH)

(73) Assignee: EMS-Patent AG, Domat/EMS (CH)

( * ) Notice: Subject to any disclaimer, the term of this patent is extended or adjusted under 35 U.S.C. 154(b) by 0 days.

(21) Appl. No.: 13/945,105

(22) Filed: Jul. 18, 2013

(65) Prior Publication Data

US 2014/0179842 A1 Jun. 26, 2014

(30) Foreign Application Priority Data

Dec. 21, 2012 (EP) .................................... 12199085

(51) Int. Cl.
*C08K 5/3477* (2006.01)
*C08L 77/02* (2006.01)

(52) U.S. Cl.
CPC ...................................... *C08L 77/02* (2013.01)
USPC .......................................... 524/101; 524/141

(58) Field of Classification Search
CPC ............................ C08K 5/34924; C08K 5/523
USPC ................................................ 524/101, 141
See application file for complete search history.

(56) References Cited

U.S. PATENT DOCUMENTS

| 6,766,091 B2 | 7/2004 | Beuth et al. |
| 2004/0001682 A1 | 1/2004 | Beuth et al. |
| 2011/0040023 A1 | 2/2011 | Buhler et al. |
| 2011/0171408 A1 | 7/2011 | Saillard et al. |

FOREIGN PATENT DOCUMENTS

| DE | 37 17 928 | 5/1988 |
| DE | 10 2004 045 775 | 4/2006 |
| EP | 1 376 156 | 1/2004 |
| JP | 2000-160031 | 6/2000 |

OTHER PUBLICATIONS

Australian Search Report in counterpart application No. AU 2013206399, dated Apr. 1, 2014.

*Primary Examiner* — Peter Szekely
(74) *Attorney, Agent, or Firm* — Greenblum & Bernstein, P.L.C.

(57) ABSTRACT

Flame-retardant polyamide molding material for sheathing optical waveguides/cables, includes:
(A) 40-71 wt.-% copolyamide MACMI/12;
(B) 20-51 wt.-% of at least one aliphatic polyamide;
(C) 6-20 wt.-% melamine cyanurate;
(D) 3-10 wt.-% aryl phosphate; and
(E) 0-6 wt.-% further additives.
Components total 100 wt.-% of polyamide molding material. Copolyamide a MACMI/12 has laurin lactam content of 23-45 mol-% in relation to molar sum of monomers MACM, isophthalic acid, and laurin lactam of this copolyamide. Isophthalic acid in copolyamide MACMI/12 can be entirely/partially replaced by terephthalic acid. Test specimen produced from this polyamide molding material has Shore hardness D of at least 77, and buckling test using PA12 extrudate coated with this molding material is passed upon winding around metal rod having 12 mm diameter. PA12 extrudate for buckling test has diameter of 1.5 mm and coating 0.7 mm thick. Optical waveguides/cables sheaths made of this polyamide molding material have bite-inhibiting effect in relation to rodents.

21 Claims, No Drawings

FLAME-RETARDANT POLYAMIDE MOLDING MATERIAL AND THE USE THEREOF

CROSS-REFERENCE TO RELATED APPLICATIONS

The present application claims priority under 35 U.S.C. §119(a) of European Patent Application No. 12 199 085 filed Dec. 21, 2012, the disclosure of which is expressly incorporated by reference herein in its entirety.

BACKGROUND OF THE INVENTION

1. Field of the Invention

The invention relates to a flame-retardant polyamide molding material for sheathing optical waveguides and optical cables, and the use thereof.

2. Discussion of Background Information

Mostly glass fibers (glass optical fibers, GOF) are used as optical fibers, using which large quantities of data may be transmitted over large distances. Plastic optical waveguides (polymer optical fibers, POF) can also be used for transmitting light signals over short distances. The optical fibers are coated directly at the fiber producer for better handling and for protection, optionally with a lacquer and in any case with a first plastic layer, the so-called primary coating, also called cladding. In the case of polymer optical fibers, the primary coating consists of a fluoropolymer, for example.

The optical fiber provided with a primary coating is designated in this application as an optical waveguide.

The secondary coating or sheathing or enveloping of the optical waveguide with plastic is performed during the core production. In general, the term sheathing is primarily used as the generic term for the secondary coating or sheathing or enveloping of an optical waveguide or in the case of an optical cable hereafter in the description of the invention.

The manner of designing such sheaths in the case of optical waveguides or optical cables is known to a person skilled in the art. A representative and recognized standard work for this purpose is the "Kabelhandbuch [Cable Handbook] Daetwyler" from October 2000 (Daetwyler Kabel+Systeme GmbH, D-85375 Neufahrn), which can be retrieved directly via the Internet as a UNILAN handbook from Fachhochschule Flensburg [Flensburg Polytechnic] (Germany) under the address: http://www2.wi.fh-flensburg.de/wi/riggert/Netzwerke/Kabelhandbuch-Daetwyler.

The construction of glass fiber cables is described in Chapter 4.6 of the Kabeihandbuchs-Daetwyler. According to subchapter 4.6.2 about core types, the unit made of optical fiber, primary coating, and secondary coating is designated as a core, i.e., this unit forms an optical core. According to this subchapter, there are fundamentally two embodiments for the secondary coating or sheathing, specifically a tight envelope (tight core or full core) or a loose envelope (hollow core), cf. FIG. 4.28. If a plurality of optical waveguides are inserted into a loose envelope, such a unit is referred to as a bundle core, cf. FIG. 4.30. An intermediate step between a full acore and a hollow core is the compact core according to FIG. 4.32, in which the sheathing has only a small distance from the optical fiber. Intermediate spaces between optical waveguide and sheathing are filled out using a gel.

An optical cable is obtained according to subchapters 4.6.3 and 4.6.4 by twisting together a plurality of optical cores to form a cable core, and applying a suitable jacket around the cable core, cf. FIG. 4.34. This jacket of an optical cable which sheaths everything is also understood as sheathing as defined in the present invention.

Transparent copolyamides are described in DE 37 17 928 A1, which necessarily contain bis(4-amino-3-methyl-5-ethyl-cyclohexyl)methane. Their suitability for optical waveguide sheathing is mentioned. Inter alia, flame retardants are mentioned as possible additives, without being specified in greater detail.

Polyamide molding materials having amino end groups excess as an adhesive protective layer of optical waveguides are described in DE 10 2004 045 775 A1. These polyamide molding materials are stabilized and preferably contain flame retardants.

Previous sheaths made of polyamide materials according to the prior art could not meet certain requirements optimally or could not meet them simultaneously. Thus, certain materials do not have a flame retardant or a halogen-free flame retardant, as is required above all for interior uses. For installations in the interior area and in automobile construction, the optical cores must additionally be able to bend well without buckling. For the use in the outside area (outside applications), robust sheaths are required, which protect the optical waveguides from weather influences and from gnawing by rodents. The collective term "rodents" not only means rodents according to the biological order here, but rather gnawing or biting animals of any type, e.g., rats, lagomorphs, or martens, which are among the predators.

SUMMARY OF THE EMBODIMENTS

The object of the present invention was therefore to provide a polyamide molding material, which is suitable for the sheathing of optical waveguides and optical cables, and which meets the requirements for use in the case of optical cores and optical cables both for interior applications and also for exterior applications.

This object is achieved according to the present invention with a flame-retardant polyamide molding material having the features of claim 1.

Preferred embodiments of this flame-retardant polyamide molding material and uses thereof result from the dependent claims.

DETAILED DESCRIPTION OF THE EMBODIMENTS

The polyamide molding material according to the invention is distinguished in that it is universally suitable for the sheath of all above-mentioned optical waveguides, core types, and optical cables.

The following statements apply for each individual one of these sheaths:
- The sheath can consist of one or more layers, wherein at least one of these layers consists of the molding material according to the invention.
- The at least one layer is preferably not the layer of the sheath directly adjoining the primary coating of the optical waveguide.
- The at least one layer particularly preferably forms at least one of the two layers selected from the outermost and/or second-outermost layer of the sheath.
- The at least one layer very particularly preferably forms the outermost layer of the sheath.

The polyamide molding material according to the invention has the following composition and features:
(A) 40 to 71 wt.-% copolyamide MACMI/12;
(B) 20 to 51 wt.-% of at least one aliphatic polyamide;
(C) 6 to 20 wt.-% melamine cyanurate;
(D) 3 to 10 wt.-% aryl phosphate; and
(E) 0 to 6 wt.-% further additives;
wherein the components (A) to (E) add up to 100 wt.-% of the polyamide molding material. The copolyamide MACMI/12 has a laurin lactam content of 23 to 45 mol-% in relation to the molar sum of the monomers MACM, isophthalic acid, and laurin lactam of this copolyamide, wherein the isophthalic acid in the copolyamide MACMI/12 can be entirely or partially replaced by terephthalic acid.

The Shore hardness D is preferably used as the measure for the bite-inhibiting effect of the polyamide molding material, which must preferably be at least 77 for this purpose (measured according to ISO 868).

A buckling test using a PA 12 extrudate coated with the polyamide molding material is preferably passed upon winding around a metal rod having a diameter of 12 mm, wherein the PA 12 extrudate for this buckling test has a diameter of 1.5 mm and is coated 0.7 mm thick with the polyamide molding material to be tested, from which a total diameter of 2.9 mm results. The production of this special, coated extrusion test specimen is described hereafter in the section about the production of the test specimens.

Test specimens produced from the polyamide molding material according to the invention must have at least the classification V2 in the vertical fire test 50 W (20 mm) according to UL-94 of Underwriters Laboratories both at a thickness of 1.6 mm and also at a thickness of 0.8 mm.

A corresponding, flame-retardant polyamide molding material can be used for producing an optical waveguide sheath or a sheath of an optical cable by means of a tubing sheath tool. Furthermore, the use also relates to such a sheathed optical waveguide as an optical core, and/or the use of such a sheathed optical cable for interior applications and/or exterior applications, wherein sheaths made of this polyamide molding material have a bite-inhibiting effect in relation to rodents. It is possible to use a flame-retardant polyamide molding material according to the invention only for the external jacket of an optical cable.

The production of multilayer sheaths can either:
- be performed in separate steps on the respective last produced outer layer, or
- be performed in an extrusion line using various extruders successively, for example, in the so-called tandem method, or
- be performed by coextrusion of more than one protective envelope simultaneously.

In a preferred, dependent embodiment, the flame-retardant polyamide molding material is composed of:
(A) 45 to 66 wt.-% copolyamide MACMI/12;
(B) 20 to 46 wt.-% of at least one aliphatic polyamide;
(C) 8 to 15 wt.-% melamine cyanurate;
(D) 3 to 8 wt.-% aryl phosphate; and
(E) 0 to 4 wt.-% further additives;
wherein the components (A) to (E) add up to 100 wt.-% of the polyamide molding material, and in addition the remaining conditions of the independent product claim apply.

In a particularly preferred, dependent embodiment, the flame-retardant polyamide molding material is composed of:
(A) 47 to 63 wt.-% copolyamide MACMI/12;
(B) 20 to 40 wt.-% of at least one aliphatic polyamide;
(C) 10 to 14 wt.-% melamine cyanurate;
(D) 3 to 6 wt.-% aryl phosphate; and
(E) 0.05 to 4 wt.-% further additives;
wherein the components (A) to (E) add up to 100 wt.-% of the polyamide molding material, and in addition the remaining conditions of the independent product claim apply.

The copolyamide MACMI/12 of the flame-retardant polyamide molding material preferably has a laurin lactam content of 25-40 mol-%, particularly preferably 30-40 mol-%, in relation to the molar sum of the monomers MACM, isophthalic acid, and laurin lactam of this copolyamide.

The glass transition temperature of the copolyamide MACMI/12 is preferably in the range of 140-185° C., particularly preferably in the range of 150-170° C., and very particularly preferably in the range of 155-165° C.

The relative viscosity measured in m-cresol of the copolyamide MACMI/12 is preferably in the range of 1.40 to 1.65, particularly preferably in the range of 1.45 to 1.60, very particularly preferably in the range of 1.50 to 1.60. The measuring method for the relative viscosity (RV) is described in the relevant section hereafter.

In the flame-retardant polyamide molding material, the at least one aliphatic polyamide of the component (B) is preferably linear-aliphatic. A linear-aliphatic polyamide is understood as a polyamide which is synthesized from linear-aliphatic monomers. Lactams are expressly included in this case among the linear-aliphatic monomers. The linear-aliphatic monomers include neither branched, nor cycloaliphatic, nor aromatic monomers, nor monomers containing aromatic units.

The at least one linear-aliphatic polyamide is particularly preferably selected from the group consisting of PA 6, PA 11, PA 12, PA 66, PA 69, PA 610, PA 612, PA 614, PA 618, PA 1010, PA 1012, PA 1212, PA 6/66, PA 6/12, PA 6/66/12, polyether amides, polyether ester amides, polyester amides, copolyamides thereof, and mixtures thereof. The at least one linear-aliphatic polyamide is very particularly preferably selected from the group consisting of PA 1010 and mixtures of PA 1010 with at least one other linear-aliphatic polyamide.

The relative viscosity measured in m-cresol of the aliphatic polyamide is preferably in the range of 1.40 to 2.70, particularly preferably in the range of 1.50 to 2.15, very particularly preferably in the range of 1.55 to 1.95.

The melamine cyanurate can be used as a powder or in the form of a masterbatch. If a melamine cyanurate masterbatch is used, the carrier material is preferably selected from the group of polyamides, particularly preferably from the same group of materials as the component (B).

The aryl phosphate of the flame-retardant polyamide molding material according to the invention is preferably selected from the group consisting of tricresyl phosphate, triphenyl phosphate, diphenyl cresyl phosphate, bis(methylphenyl)-phenyl phosphate and mixtures thereof.

The further additives are preferably selected from the group consisting of inorganic stabilizers, organic stabilizers, lubricants, polytetrafluoroethylene, colorants, marking materials, inorganic pigments, organic pigments, IR absorbers, antistatic agents, antiblocking agents, nucleating agents, crystallization accelerators, crystallization delayers, conductivity additives, carbon black, graphite, carbon nanotubes, demolding agents, separating agents, optical lighteners, photochromic additives, softeners, adhesion promoters, anti-dripping agents, metallic pigments, metal glitters, metal-coated particles, and mixtures thereof.

For example, antioxidants, antiozonants, light protection agents, UV stabilizers, UV absorbers, or UV blockers can be used as the stabilizers or aging protection agents.

Such additives can also be contained in the other plastic layers.

A test specimen produced from the polyamide molding material according to the invention particularly preferably has a Shore hardness D in the range of 80-98, very particularly preferably in the range of 80-95. A high Shore hardness D of preferably at least 77 is required for a bite-inhibiting effect in relation to rodents.

The requirements also include, as already mentioned, achieving preferably at least the classification V2 in the vertical fire test 50 W (20 mm) according to UL-94 at test specimen thicknesses of 1.6 and 0.8 mm.

The buckling test using a PA 12 extrudate coated with the polyamide molding material according to the invention is particularly preferably also passed at a metal rod diameter of 10 mm, very particularly preferably even at a metal rod diameter of 8 mm, i.e., in the case of a very tight bend.

In any case, the buckling test must be passed in the range of less than 14 mm metal rod diameter, in order to meet the requirement according to the invention.

The sheath or secondary coating or envelope can preferably be constructed of 1 to 5 or of 1 to 4, particularly preferably of 1 to 3, very particularly preferably of 1 to 2 layers.

The layer thickness of the at least one layer made of the polyamide molding material according to the invention is preferably 0.5 mm to 1.5 mm, particularly preferably 0.7 mm to 1.5 mm, very particularly preferably 0.7 mm to 1.2 mm.

The layer thickness of the further sheath layers is preferably 0.2 mm to 1.5 mm, particularly preferably 0.3 mm to 1.2 mm, very particularly preferably 0.4 mm to 1.0 mm, particularly especially preferably 0.45 mm to 0.9 mm.

If adhesion is desired between individual layers of the sheath, an adhesion promoter layer is used between the affected layers in this further embodiment. The layer thickness of such adhesion promoter layers is preferably 0.05 mm to 1.2 mm, particularly preferably 0.2 mm to 0.9 mm, very particularly preferably 0.3 mm to 0.7 mm.

At least one of the sheath layers consists of the polyamide molding material according to the invention. The remaining layers can be formed from polyolefins, functionalized or modified polyolefins, functionalized polyolefins, polyamides, polyethylenes, polyethylene copolymers, polypropylene, polypropylene copolymers, ethylene-tetrafluorethylene copolymers, ethylene-vinyl acetate copolymers, ethylene-vinyl alcohol copolymers, fluoropolymers, polytetrafluorethylene, ethylene-propylene copolymers, polyvinylchloride, polyvinylidene chloride, polyester, polyethylene terephthalate, polybutylene terephthalate, polyurethanes, polyoxymethylenes, cross-linked polymers, or mixtures thereof.

Polyolefins and/or polyolefin copolymers are preferably used as the adhesion promoters, which are functionalized, i.e., grafted and/or copolymerized, using acrylic acid, succinic acid, glycidyl methacrylate, and/or maleic acid anhydride. Examples of this are functionalized polyethylene having moderate, low, or very low density, functionalized linear low-density polyethylene, functionalized polypropylene, functionalized copolymers of ethylene and linear, branched, or cyclic alkenes, for example, functionalized ethylene-propylene copolymers.

Production of the Polyamide Molding Material According to the Invention:

The following description of the production is used for illustration, but is not to restrict the scope of the invention.

To produce the polyamide molding material, the components are mixed on typical compounding machines, for example, one-shaft or two-shaft extruders or screw kneaders. The components are metered individually into the intake or supplied in the form of a dry blend.

For the dry blend production, the dried granulates and optionally further additives are mixed. This mixture is homogenized for 10-40 minutes by means of a tumble mixer, drum hoop mixer, or tumble dryer. To prevent the absorption of moisture, this can be performed under dried protective gas.

The compounding is performed at set cylinder temperatures of 230° C. to 290° C. Vacuum can be applied before the die or atmospheric degassing can be performed. The melt is extruded in strand form, cooled in the water bath at 10 to 80° C., and subsequently granulated. The granulate is dried for 12-24 hours at 80 to 120° C. under nitrogen or in vacuum to a water content of less than 0.1 wt.-%.

In addition, it is also to be noted that the term "polyamide" is a generic term which comprises both homopolyamides and also copolyamides and mixtures and blends of homopolyamides and/or copolyamides. The abbreviated polyamide nomenclature conforms to the norm ISO 1874-1:1992(E).

The present invention will be described in greater detail on the basis of the following examples, which illustrate the invention, but are not to restrict the scope of the invention.

The materials listed in following Table 1 were used in the examples and comparative examples.

TABLE 1 materials used

| Component | Description | Trade name | Producer |
| --- | --- | --- | --- |
| (A1) | copolyamide MACMI/12 made of 3,3'-dimethyl-4,4'-diaminocyclohexylmethane (32.7 mol-%), isophthalic acid (32.7 mol-%), and laurin lactam (34.6 mol-%). RV 1.55 (measured in a solution of 0.5 g copolyamide in 100 ml m-cresol at 20° C.). glass transition temperature 160° C. | — | EMS-CHEMIE AG, Switzerland |
| (A2) | copolyamid MACMI/12 made of 3,3'-dimethyl-4,4'-diaminocyclohexylmethane (40.5 mol-%), isophthalic acid (40.5 mol-%), and laurin lactam (19 mol-%). RV 1.45 (measured in a solution of 0.5 g copolyamide in 100 ml m-cresol at 20° C.). glass transition temperature 200° C. | — | EMS-CHEMIE AG, Switzerland |
| (B1) | polyamide 1010 made of decane-1,10-diamine and octane-1,8-dicarboxylic acid. RV 1.73 (measured in a solution of 0.5 g | — | EMS-CHEMIE AG, Switzerland |

TABLE 1-continued

| | | | |
|---|---|---|---|
| | materials used | | |
| Component | Description | Trade name | Producer |
| | polyamide in 100 ml m-cresol at 20° C.). melting point 200° C. | | |
| (C) + (B2) | masterbatch made of melamine cyanurate and polyamide 12 in the weight ratio 60:40, i.e., 60% (C) and 40% (B2), (B2) = PA 12 | Luvogard MB 60/ PA 12 | Lehmann & Voss & Co., Germany |
| (D) | reaction material made of phenol and p/m-cresyl phosphate with diphenyl cresyl phosphate as the main components. composition in wt.-%: diphenyl cresyl phosphate 42-47 bis(methylphenyl) phenyl phosphate 24-26 triphenyl phosphate 23-26 tricresyl phosphate (m-m-m, m-m-p, m-p-p, p-p-p) 4-6 density 1.205-1.215 g/ml at 20° C. boiling point > 224° C. at 5 mbar | Disflamoll DPK | Lanxess, Germany |
| (E1) heat stabilizer | ethylene bis(oxyethylene)bis[3-(5-tert butyl-4-hydroxy-m-tolyl)propionate] CAS-Nr. 36443-68-2 | Irganox 245 | BASF, Germany |
| (E2) UV stabilizer | phenol, 2-(2H-benzotriazol-2-yl)-4,6-bis(1-methyl-1-1phenylethyl) CAS-Nr. 70321-86-7 | Tinuvin 234 | BASF, Germany |

The Measurements were Carried Out According to the Following Test Methods:
Shore Hardness D:
  ISO 868
  ISO tension rod as the test specimen
  norm: ISO/CD 3167, type Al, 170×20/10×4 mm
  temperature 23° C.
  The measurement was performed on the widest part of the tension rod.
  Remark: Shore A and Shore D values cannot be correlated with one another because of the different penetration bodies.
Buckling Test:
  To test the buckling resistance of a sheath, firstly a PA 12 extrudate, which is used as a supporting core and has a diameter of 1.5 mm, is coated 0.7 mm thick with the polyamide molding material to be tested, so that the total diameter is 2.9 mm. The production of this special coated extrusion test specimen is described hereafter in the section about the production of the test specimens. This composite is then wound around a metal rod, specifically five turns are carried out. Neither buckling points nor stress whitening may occur, if the buckling test is to be considered to be passed at the relevant metal rod diameter. Metal rods which are graduated in millimeters in diameter are available for the test. The range from 18 mm diameter down to the very tight bend at 8 mm diameter is of interest for the test.
Vertical Fire Test 50 W (20 mm)
  UL-94 Underwriters Laboratories
  testing rod 125×13×0.8 mm
  testing rod 125×13×1.6 mm
Relative Viscosity (RV):
  ISO 307
  0.5 g polyamide (PA) or copolyamide (CoPA) dissolved in 100 ml m-cresol measurement at temperature 20° C.
  Calculation of the relative viscosity (RV) according to $RV=t/t_0$ pursuant to section 11 of the norm.

Melting Point and Glass Transition Temperature (Tg):
  ISO norm 11357
  granulate
  The differential scanning calorimetry (DSC) was carried out at a heating rate of 20 K/minute. At the melting point, the temperature at the peak maximum is specified. The center point of the glass transition range, which is specified as Tg, was ascertained according to the method "half height".
Production of the Test Specimens:
  The test specimens for Shore D and for the fire test were produced on an injection molding machine from Arburg, model Allrounder 420 C 1000-250. Cylinder temperatures between 230 and 290° C. were used. The mold temperature was 80° C.
  The test specimens for the Shore D measurement were used in the conditioned state, for this purpose they were stored after the injection molding according to ISO 1110 for 14 days at 72° C. and 62% relative humidity.
  Special, coated extrusion test specimens for the buckling test:
  The production of the PA 12 extrudate was performed on a Nokia sheathing facility, in which the die core was replaced by a dummy core, in order to be able to extrude a strand having 1.5 mm diameter. A PA 12 having a relative viscosity of 2.20-2.30 (measured in m-cresol) was used for this purpose. The cylinder temperature of the extruder was set to 240 to 250° C. The draw-off speed was 20 m/minute. The extrudate was cooled in two successive water baths. The temperature of the first water bath was 60° C. and that of the second was 40° C.
  The PA 12 extrudate having 1.5 mm diameter was subsequently sheathed on the Nokia sheathing facility respectively using the polyamide molding materials of following examples 1 and 2 and comparative examples 3 to 6 using a layer whose thickness was 0.7 mm. The extruder zones were set to 240 to 270° C., a vacuum of 0.5 bar was used in the head, and the draw-off speed was 30 m/minute. The cooling was performed successively in two water baths. The temperature of the first water bath was 60° C. and that of the second was 40° C.

Experiments:

For the experiments, polyamide molding materials were compounded from the raw materials or components listed in Table 1, specifically using the components and the portions thereof in weight percent (wt.-%) specified in following Table 2 in the examples and comparative examples. The sum of the components used was 100 wt.-% in each case. The portion of the melamine cyanurate masterbatch was divided in each case into a fraction of pure melamine cyanurate (C) and a fraction of the carrier polymer polyamide 12, which is a linear-aliphatic polyamide (B2). The total portion of the at least one aliphatic polyamide (B) is therefore calculated in the examples and comparative examples from the sum of (B1) and (B2).

The compositions of the polyamide molding materials of the examples and comparative examples and the results of the Shore D measurement and the buckling test are summarized in Table 2.

TABLE 2

Examples and comparative examples, compositions and test results

| | Units | Examples | | Comparative examples | | | |
|---|---|---|---|---|---|---|---|
| | | 1 | 2 | 3 | 4 | 5 | 6 |
| Composition | | | | | | | |
| (A1) | wt.-% | 50 | 60 | — | — | 50 | 60 |
| (A2) | wt.-% | — | — | 50 | — | — | — |
| (B1) | wt.-% | 25 | 15 | 25 | 75 | 29 | 19 |
| (C) + (B2) | wt.-% | 20 | 20 | 20 | 20 | 20 | 20 |
| i.e. (C) | wt.-% | 12 | 12 | 12 | 12 | 12 | 12 |
| (B2) | wt.-% | 8 | 8 | 8 | 8 | 8 | 8 |
| (D) | wt.-% | 4 | 4 | 4 | 4 | — | — |
| (E1) | wt.-% | 0.5 | 0.5 | 0.5 | 0.5 | 0.5 | 0.5 |
| (E2) | wt.-% | 0.5 | 0.5 | 0.5 | 0.5 | 0.5 | 0.5 |
| Test results | | | | | | | |
| Shore D | — | 81 | 81 | nd | 72 | 79 | 81 |
| Buckling test | 18 mm | + | + | • | + | + | + |
| [metal rod | 14 mm | + | + | • | + | + | • |
| diameter] | 12 mm | + | + | • | + | • | • |
| | 8 mm | + | + | • | + | • | • |

+ passed
• not passed
nd = not determined

Table 2 shows how difficult it is to meet the two requirements of high Shore hardness D, on the one hand, and high flexibility or buckling resistance, on the other hand, simultaneously for an optical waveguide sheath. Even small deviations from the conditions of the independent product claim, which were ascertained in the inventive work, have the result that one or the other requirement is no longer met. This is drastically demonstrated with comparative example 3, where n comparison to inventive example 1, only the laurin lactam content in the copolyamide MACMI/12 is lower at 19 mol-% (cf. component A2 in Table 1) and was outside the specification of 23-45 mol-%. The buckling test was thus no longer passed even in the case of the largest tested diameter, and the Shore hardness D was therefore no longer even measured. Without a copolyamide MACMI/12 (cf. component (A)), in contrast, the polyamide molding material no longer results in the required high Shore hardness D, as comparative example 4 shows. Without the component (D), in turn, the required high Shore hardness D is achieved, but the buckling resistance is inadequate, as comparative examples 5 and 6 show.

Finding compositions according to examples 1 and 2 according to the invention having the surprising property combination was therefore anything but obvious for a person skilled in the art. It was also unexpected that the flame retardance would have to be implemented by a balanced combination of two different flame-retardants (C) and (D), so as not to worsen the other two properties. The polyamide molding materials according to the invention resulted in the classification V2 in the vertical fire test 50 W (20 mm) according to UL-94 of Underwriters Laboratories, both at 1.6 mm and also at 0.8 mm thickness of the tested test rods. The polyamide molding materials of the comparative experiments also achieved the classification V2 in this case.

Therefore, an advantageous polyamide molding material can be provided using this invention, which is usable in more varied ways compared to the polyamide molding materials heretofore used for the sheath of optical waveguides and optical cables, and surprisingly simultaneously meets the requirements for the use as a sheath in optical cores and optical cables both for interior use and also for exterior use.

The invention claimed is:

1. A flame-retardant polyamide molding material for sheathing optical waveguides and optical cables, wherein the polyamide molding material is composed of:
    (A) 40 to 71 wt.-% copolyamide MACMI/12;
    (B) 20 to 51 wt.-% of at least one aliphatic polyamide;
    (C) 6 to 20 wt.-% melamine cyanurate;
    (D) 3 to 10 wt.-% aryl phosphate; and
    (E) 0 to 6 wt.-% further additives;
    wherein the components (A) to (E) add up to 100 wt.-% of the polyamide molding material,
    wherein the copolyamide MACMI/12 has a laurin lactam content of 23 to 45 mol-% in relation to the molar sum of the monomers MACM, isophthalic acid, and laurin lactam of this copolyamide, and
    wherein the isophthalic acid in the copolyamide MACMI/12 can be entirely or partially replaced by terephthalic acid.

2. The flame-retardant polyamide molding material according to claim 1, wherein a test specimen produced from the polyamide molding material has a Shore hardness D of at least 77, and a buckling test using a PA 12 extrudate coated with the molding material is passed upon winding around a metal rod having 12 mm diameter, wherein the PA 12 extrudate for the buckling test has a diameter of 1.5 mm and is coated 0.7 mm thick.

3. The flame-retardant polyamide molding material according to claim 1, wherein the polyamide molding material is composed of:
    (A) 45 to 66 wt.-% copolyamide MACMI/12;
    (B) 20 to 46 wt.-% of at least one aliphatic polyamide;
    (C) 8 to 15 wt.-% melamine cyanurate;
    (D) 3 to 8 wt.-% aryl phosphate; and
    (E) 0 to 4 wt.-% further additives;
    wherein the components (A) to (E) add up to 100 wt.-% of the polyamide molding material.

4. The flame-retardant polyamide molding material according to claim 1, wherein a test specimen produced from the polyamide molding material at least has the classification V2 in a vertical fire test 50 W (20 mm) according to UL-94 of Underwriters Laboratories both at a thickness of 1.6 mm and also at a thickness of 0.8 mm.

5. The flame-retardant polyamide molding material according to claim 1, wherein the copolyamide MACMI/12 has a laurin lactam content of 25-40 mol % in relation to the molar sum of the monomers MACM, isophthalic acid, and laurin lactam of the copolyamide.

6. The flame-retardant polyamide molding material according to claim 1, wherein the copolyamide MACMI/12 has a glass transition temperature of 140-185° C.

7. The flame-retardant polyamide molding material according to claim 1, wherein the at least one aliphatic polyamide of the component (B) is synthesized from linear-aliphatic monomers.

8. The flame-retardant polyamide molding material according to claim 7, wherein the at least one linear-aliphatic polyamide is selected from the group consisting of PA 6, PA 11, PA 12, PA 66, PA 69, PA 610, PA 612, PA 614, PA 618, PA 1010, PA 1012, PA 1212, PA 6/66, PA 6/12, PA 6/66/12, polyether amides, polyether ester amides, polyester amides, copolyamides thereof, and mixtures thereof.

9. The flame-retardant polyamide molding material according to claim 7, wherein the at least one linear-aliphatic polyamide is selected from the group consisting of PA 1010, and mixtures of PA 1010 with at least one other linear-aliphatic polyamide.

10. The flame-retardant polyamide molding material according to claim 1, wherein the aryl phosphate is selected from the group consisting of tricresyl phosphate, triphenyl phosphate, diphenyl cresyl phosphate, bis(methylphenyl)-phenyl phosphate, and mixtures thereof.

11. The flame-retardant polyamide molding material according to claim 1, wherein the further additives are selected from the group consisting of inorganic stabilizers, organic stabilizers, lubricants, polytetrafluoroethylene, colorants, marking materials, inorganic pigments, organic pigments, IR absorbers, antistatic agents, antiblocking agents, nucleating agents, crystallization accelerators, crystallization delayers, conductivity additives, carbon black, graphite, carbon nanotubes, demolding agents, separating agents, optical lighteners, photochromic additives, softeners, adhesion promoters, anti-dripping agents, metallic pigments, metal glitters, metal-coated particles, and mixtures thereof.

12. The flame-retardant polyamide molding material according to claim 2, wherein a test specimen produced from the polyamide molding material has a Shore hardness in the range of 80-98.

13. The flame-retardant polyamide molding material according to claim 2, wherein a buckling test using a PA 12 extrudate coated with the molding material is passed in a case of winding around a metal rod having 10 mm diameter.

14. A method for producing an optical waveguide sheath or a sheath of an optical cable by a tubing sheath tool, the method comprising forming the waveguide sheath or the sheath of an optical cable with a flame-retardant polyamide molding material, according to claim 1, which is composed of:

(A) 40 to 71 wt.-% copolyamide MACMI/12;
(B) 20 to 51 wt.-% of at least one aliphatic polyamide;
(C) 6 to 20 wt.-% melamine cyanurate;
(D) 3 to 10 wt.-% aryl phosphate; and
(E) 0 to 6 wt.-% further additives;
wherein the components (A) to (E) add up to 100 wt.-% of the polyamide molding material,
wherein the copolyamide MACMI/12 has a laurin lactam content of 23 to 45 mol-% in relation to the molar sum of the monomers MACM, isophthalic acid, and laurin lactam of this copolyamide,
wherein the isophthalic acid in the copolyamide MACMI/12 can be entirely or partially replaced by terephthalic acid, and
wherein a test specimen produced from the polyamide molding material has a Shore hardness D of at least 77, and a buckling test using a PA 12 extrudate coated with the molding material is passed upon winding around a metal rod having 12 mm diameter, wherein the PA 12 extrudate for the buckling test has a diameter of 1.5 mm and is coated 0.7 mm thick.

15. The method of claim 14, wherein the waveguide sheath or the sheath of the optical cable is suitable for at least one of interior applications and exterior applications, and wherein the polyamide molding material has a bite-inhibiting effect in relation to rodents.

16. The flame-retardant polyamide molding material according to claim 5, wherein the copolyamide MACMI/12 has a laurin lactam content of 30-40 mol-%.

17. The flame-retardant polyamide molding material according to claim 6, wherein the copolyamide MACMI/12 has a glass transition temperature of 150-170° C.

18. The flame-retardant polyamide molding material according to claim 17, wherein the copolyamide MACMI/12 has a glass transition temperature of 155-165° C.

19. The flame-retardant polyamide molding material according to claim 12, wherein the test specimen produced from the polyamide molding material has a Shore hardness in the range of 80-95.

20. The flame-retardant polyamide molding material according to claim 2, wherein a buckling test using a PA 12 extrudate coated with the molding material is passed in a case of winding around a metal rod having 8 mm diameter.

21. The flame-retardant polyamide molding material according to claim 1, wherein the polyamide molding material has a bite-inhibiting effect in relation to rodents.

* * * * *

UNITED STATES PATENT AND TRADEMARK OFFICE
CERTIFICATE OF CORRECTION

PATENT NO. : 8,859,652 B2  
APPLICATION NO. : 13/945105  
DATED : October 14, 2014  
INVENTOR(S) : F. Buehler et al.

Page 1 of 1

It is certified that error appears in the above-identified patent and that said Letters Patent is hereby corrected as shown below:

In the Claims

At column 11, line 49 (Claim 14, line 5) please change "material, according to claim 1," to -- material according to claim 1, --.

Signed and Sealed this
Fourteenth Day of July, 2015

Michelle K. Lee
*Director of the United States Patent and Trademark Office*